United States Patent [19]

Yamasaki et al.

[11] 4,053,546

[45] Oct. 11, 1977

[54] METHOD OF MAKING A LEATHER-LIKE SHEET MATERIAL BY COAGULATING TWO POLYMERS

[75] Inventors: Tsuyoshi Yamasaki; Kunio Kogame, both of Kurashiki, Japan

[73] Assignee: Kuraray Co., Ltd., Kurashiki, Japan

[21] Appl. No.: 644,120

[22] Filed: Dec. 24, 1975

[30] Foreign Application Priority Data

Dec. 25, 1974  Japan .................. 49-4082

[51] Int. Cl.² ................ B29D 27/04; B05D 5/00
[52] U.S. Cl. .................... 264/49; 264/103; 264/136; 264/171; 156/77; 260/2.5 AY; 427/246; 427/371; 427/401; 428/315; 428/317; 428/425; 428/904
[58] Field of Search ............ 427/246, 336, 245; 428/904, 425, 317; 156/77; 260/2.5 AY; 264/49, 103, 136, 171

[56] References Cited

U.S. PATENT DOCUMENTS

| | | | |
|---|---|---|---|
| 3,544,357 | 12/1970 | Noda et al. | 427/246 |
| 3,684,556 | 8/1972 | Mahl et al. | 427/246 |
| 3,817,820 | 6/1974 | Smith | 428/904 X |
| 3,922,470 | 11/1975 | Amano et al. | 427/246 X |

OTHER PUBLICATIONS

Hackh's Chemical Dictionary, 4th ed., New York, McGraw-Hill Book Co., p. 168.

*Primary Examiner*—Ronald H. Smith
*Assistant Examiner*—Evan K. Lawrence
*Attorney, Agent, or Firm*—Stevens, Davis, Miller & Mosher

[57] ABSTRACT

Method of making a leather-like sheet material having a low bounce impact elasticity, which comprises: (a) mixing (i) a solvent solution of a polymer (A) consisting mainly of an elastomer and (ii) a dispersion in a liquid of a polymer (B) consisting mainly of an elastomer, thereby obtaining a composite solution containing fine particles of (B) dispersed in a solution of polymer (A); (b) coating a sheet or impregnating a fibrous mat substrate with the composite solution; (c) immersing the substrate in a coagulation bath to deposit and coagulate both polymers; and (d) drying said sheet or mat.

4 Claims, No Drawings

METHOD OF MAKING A LEATHER-LIKE SHEET MATERIAL BY COAGULATING TWO POLYMERS

BACKGROUND OF THE INVENTION

1. Field of the Invention

The present invention relates to a novel method for producing a stable porous polymer sheet having an excellent sponge formability and a low bounce impact elasticity.

2. Description of the Prior Art

In the production of porous polymer sheets by treating a polymer solution consisting mainly of an elastic polymer in a non-solvent for the polymer, a large number of proposals for solving problems, for example, making porous sponge structure uniform, producing such a porous sheet material without collapsing the sponge structure upon drying or shaping of the sheet or causing an extreme deformation, and making the bounce impact elasticity low without losing the inherent characteristics of the elastic polymer, have been heretofore made. These facts are important when the porous polymer sheet is used as a surface layer of a leather raw material. However, the previous processes, for example, in which in order to improve the sponge formability and to make the bounce impact elasticity low, polyurethane elastomer is used as the elastic polymer and the ratio of the hard segment and the soft segment which constitute the polyurethane elastomer is varied, the kind of polyurethane elastomer is varied, or various coagulation regulators (organic or inorganic compound or solvent composition) are together used, cannot satisfy the above described problems.

For example, the production of a soft and flexible sheet material, can be attained by selecting a polyurethane elastomer having a small amount of the hard segment but such a polyurethane elastomer is poor in coagulating ability (sponge formability) and the elasticity becomes large. The coagulating ability of the polyurethane elastomer having a small amount of hard segment can be improved to a certain degree by using various coagulation regulators but the improvement is not only insufficient, but also the elasticity cannot be lowered. Accordingly, it is very difficult to produce a soft and flexible sheet having a high drapability and high vapor permeability and moisture permeability by such a means.

SUMMARY OF THE INVENTION

An object of the present invention is to increase the producibility of the sheet by enhancing the coagulation rate of the polymer solution; increasing the rate of washing and removing of the polymer solvent; and providing a porous polymer sheet having a high sponge formability, a stable sponge structure, a low bounce impact elasticity and a low compression elasticity coefficient.

Another object of the present invention is to provide a novel process for producing a porous polymer sheet having a high sponge formability, a uniform and stable sponge structure, a low bounce impact elasticity, and an excellent drapability, by using a conventional polyurethane elastomer which is high in elasticity and is poor in sponge formability.

The other object is to provide a porous sheet having a high moisture permeability and an excellent shaping workability.

The present invention consists in the production of a porous polymer sheet having an excellent sponge structure, a high softness and flexibility and a low bounce impact elasticity characterized in that a composite solution prepared by (i) mixing a solution of a polymer (A) consisting mainly of an elastomer and (ii) a dispersion of a polymer (B) consisting mainly of an elastomer, in which the polymer (A) maintains the dissolved state and the polymer (B) is not completely dissolved and maintains the dispersed state, is immersed in a coagulation bath capable of depositing all the polymers to coagulate the polymers.

In the present invention, since a very specific composite solution is used wherein polymer fine particles are present in a polymer solution, the coagulation behavior is entirely different from the conventional single polymer solution or single polymer dispersion, so that the structure of the elastic polymer deposited in the coagulation bath is entirely different. For this reason, the resulting sheet material has the similar drapability to natural leather while keeping the desirable properties of the used elastic polymer.

DESCRIPTION OF THE PREFERRED EMBODIMENTS

The polymers (A) and (B) to be used in the present invention must be elastomers and have an initial modulus of less than $5 \times 10^2$ Kg/cm$^2$, preferably less than $3 \times 10^2$ Kg/cm$^2$, and they are, for example, polyurethanes or polyurethane ureas obtained by reacting at least one of polymer glycols, such as polyethylene adipate glycol, polyethylene propylene adipate glycol, polybutylene adipate glycol, polyhexamethylene adipate glycol, polydecamethylene adipate glycol, polycaprolactone glycol, polyethylene ether glycol, polypropylene ether glycol, polyhexamethylene ether glycol and polycyclohexy-4,4'-methyl ether glycol having an average molecular weight of 500–4,000 with an aromatic or aliphatic polyisocyanate selected from the group consisting of 4,4'-diphenylmethane diisocyanate, tolylene diisocyanate, xylylene diisocyanate, hexamethylene diisocyanate, decamethylene diisocyanate and the like and a lower molecular diamine or diol having two active hydrogen atoms; polyacrylic acid esters; acrylonitrile-butadiene copolymers; styrenebutadiene copolymers; polybutadiene; polyisoprene; acrylic acid ester copolymers and other elastic polymers. Furthermore, in order to adjust the properties of the polymer structures, for example, to adjust the toughness, dyeability, bending property, heat resistance, shaping workability and plasticity of the polymer sheet or to increase the amount, if necessary, for example, polyamide, modified polyamide, polyamino acid, polyurea, polyvinyl chloride, styrene copolymer, polyester, polyacrylonitrile, melamine resin, polyolefin, cellulose derivative, clay and the like may be added to the polymer.

In the present invention, the polymer (A) is dissolved in a solvent and the polymer (B) is dispersed in a liquid dispersing medium and is not completely dissolved in the solvent for the polymer (A) and when the dispersion of the polymer (B) is mixed with the solution of the polymer (A) in a given ratio, the polymer (B) is more or less dissolved in the solution of the polymer (A) or uniformly dispersed in a swelled state. For example, the composite solution prepared by mixing a dispersion of polytetramethylene ether series polyurethane having a large number of branches in a dispersing medium consisting mainly of water, with a dimethyl formamide solution (hereinafter abridged as DMF) of polytetramethylene ether glycol series polyurethane or polycaprolactone glycol series polyurethane, is a stable composite solution in which the polymer (B) is uniformly dispersed in a swelled state. The particle size of the dispersion of the polymer (B) is less than 5 μ, preferably less than 2 μ, more particularly 0.1–b 1.5 μ in view of the stability of the composite solution, the uniformity of the sponge formability and the physical properties of the formed polyurethane sheet. In addition, the stable and uniform dispersion can be obtained by mixing an aqueous dispersion of polyacrylic acid ester as the polymer (B) to the above described polymer (A) solution. Furthermore, the composite solution can be obtained by adding a solution of polyurethane (polymer (B) formed by using polyether diol as a soft segment and a diamine as a chain extender to the polymer (A) solution dissolving polybutylene adipate series polyurethane and polyvinyl chloride in tetrahydrofuran to gel and deposit the polymer (B), or can be obtained by mixing an aqueous dispersion of acrylonitrile-butadiene (NBR) and/or polyurethane aqueous dispersion (polymer (B)), which is not completely dissolved in NBR, to DMF solution of polyester series polyurethane (polymer (A)) added with NBR soluble in DMF.

The preferable mixture ratio of the polymer (A) to the polymer (B) is 95:5–30:70, more preferably 90:10–b 50:50 parts by weight. Within this range, the maximum effect of the present invention can be attained.

In the present invention, when the composite solution obtained by mixing the polymer (B) dispersion to the polymer (A) solution is coated on a supporting sheet in a desired thickness and then the coated supporting sheet is immersed in a coagulating bath capable of depositing all the polymers, for example, water, alcohol, water-alcohol mixed solution, a mixed solution of water-polymer solvent consisting mainly of water, petroleum series hydrocarbons and the like to coagulate the polymers, the polymer composition forms a relatively uniform sponge structure and provides a porous polymer sheet (sheet I) which maintains a stable sponge structure upon drying and shaping. The resulting porous polymer sheet can be directly used as a polyurethane porous sheet after being colored or shaped or can be preferably used for a surface layer constituting the leather raw material. The resulting porous polymer sheet (sheet I) is lower in bounce impact elasticity giving a rubbery feeling than the conventional porous polymer sheet, is soft and flexible, has a high drapability and further a high vapor permeability and bending resistance, and is excellent in shaping operations, such as cutting and sewing. As the supporting sheets to be used for obtaining the porous polymer sheet (sheet I), use may be made of a plastic sheet; a metal belt; a woven or non-woven fabric sheet obtained by being impregnated with a polyolefin, such as polyethylene, coagulating said polyolefin and smoothening the surface; or a woven or non-woven fabric sheet, on a surface of which, a polyolefin film, such as polyethylene, is adhered by fusing.

When the sheet I is used as the surface layer constituting the leather raw material, for example, said sheet I is adhered to at least one surface of a fibrous substrate composed of a fibrous mat of knitted fabric, woven fabric or non-woven fabric, or these fabrics impregnated with a resin, more particularly, an entangled non-woven fabric impregnated with a polymer consisting mainly of an elastic polymer; and then the surface of the porous polymer sheet is subjected to the finishing treatments, for example, coloring, pattern pressing and the like. By such a process, a leather-like sheet material can be obtained, which is lower in bounce impact elasticity giving a rubbery feeling than the conventional leather-like sheet material and is excellent in the feeling, appearance and shaping workability and good in the compatability upon dressing.

Moreover, in the present invention, a fibrous mat is impregnated with the composite solution according to the present invention and then the thus treated fibrous mat is immersed in a coagulation bath capable of depositing all the polymers, to coagulate the polymers, whereby a sheet material can be produced (sheet material II) which has sufficiently strong, soft, flexible and resilient feeling to be suitable for a leather raw material and has an excellent drapability. This sheet material II may be used as a substrate for an artificial leather directly or after smoothening the surface. By dividing this sheet material at the middle portion of the thickness, or forming naps on at least one surface of said sheet material by buffing, fluffing, brushing and the like without dividing said sheet material, a suede-like sheet material can be obtained. If necessary, said suede-like sheet material is subjected to finishing treatments, such as dyeing, crumpling and the like, thereby the falling out of the naps due to surface abrasion does not substantially occur, the writing effect of naps is improved, and the shaping workability is particularly excellent.

When the leather-like sheet materials provided with a surface layer are produced according to the present invention, more preferable leather-like sheet materials can be produced by adhering the above described sheet I on the substrate (sheet material II) obtained by impregnating the above described fibrous mat with the composite solution according to the present invention and coagulating said composite solution, but the production of such preferable leather-like sheet materials is not limited to the above described process. For example, a fibrous mat can be impregnated with the composite solution and further the surface of the mat can be coated with the same or different solution as the composite solution, after which the coagulation is effected in a coagulation bath capable of depositing all the polymers to produce the leather-like sheet material provided with a surface layer. Alternatively, a fibrous mat is previously impregnated with the composite solution and the composite solution is coagulated and then the same or different solution as the composite solution is coated on the resulting sheet material II and the solution is coagulated.

As fibers constituting the fibrous mats when the fibrous mat is used in the present invention, usual fibers may be directly used and these fibers, for example, include semi-synthetic fibers obtained from cellulose derivatives and fibers obtained by spinning spinnable symthetic polymers, for example, polyesters, such as polyethylene terephthalate, polybutylene terephthalate, polyethylene isophthalate or modified polyesters thereof; polyamides, such as 6-nylon, 66-nylon, 610-nylon, 8-nylon, 11-nylon or modified nylons thereof; polyolefins, such as polyethylene, polypropylene, polybutylene; cyclic vinyl or copolymers, such as polystyrene, poly -α-methylstyrene chlorinated polystyrene, polyvinyl toluene; acrylonitrile, polyvinyl alcohol, polyvinyl acetate, polyvinyl chloride, ethylene-vinyl acetate copolymer, polyurethane, polyurea and the like, by a melting process, dry proccess or wet process. These fibers may be used in various structures. However, as the fibers constituting the fibrous mats according to the present invention, the mix-spun fibers which are particularly useful are produced from at least two of the above described spinnable polymers having different solubility in a solvent by the following processes:

1. These polymers are heated and melted in a vessel or dissolved in a common solvent to form a mixture and the resulting mixture is spun out from a spinneret.
2. These polymers are melted or dissolved separately and the resulting solutions or melts are mixed before orifices of a spinneret so that one polymer is dispersed in the other polymer by a mechanically dynamic function or a static fuction due to flow, and the mixture is spun out from the orifices.
3. These polymers are melted or dissolved separately and these melts or solutions are mixed by control of a nozzle to disperse one polymer in the other polymer and the mixture is spun out from orifices.

In these mix-spun fibers, at least one high polymer is present as a plurality of fine denier fiber components in the dispersing medium component of the other high polymer and when the mix spun fibers are treated with a solvent for said dispersing medium component to dissolve and remove the dispersing medium component, the fine denier fibers are formed as a bundle fiber, while when the mix-spun fibers are teated with a solvent for the fine denier fiber component, said fine denier fiber component is gradually dissolved and oriented-multihole fibers wherein said holes are formed in the fiber axial direction, are obtained.

The fibrous mats according to the present invention include non-entangled fibrous mats obtained by forming a web from staple fibers or filaments of the above described usual fibers or mix spun fibers through a wet process or a dry process, if necessary forming a laminated web from a plurality of such webs, mechanically entangled fibrous mats obtained by subjecting such webs to needle punching or jetting, a knitted or woven fabric or a laminate of the knitted or woven fabric with the web. In these fibrous mats, the joining portions of the fibers in the fibrous mat may be temporarily bonded and the fibers are temporarily set by applying a size on the fibrous mat or by using easily heat softening fibers or easily heat softening substance of a component constituting the mix spun fibers and if necessary, the fibrous mat may be additionally set by compression. This setting may be partially or substantially removed in the final product.

When the mix-spun fibers are used for constituting the fibrous mat in the present invention, the dispersing medium component or the fine denier fiber component constituting said mix-spun fibers may be partially or substantially dissolved off in any desired stage before or after impregnation and coagulation of the composite solution. When the fibrous mat is temporarily set, said fibrous mat may be treated with a solvent for the substance used for the setting to remove partially or completely the setting after impregnation and coagulation of the composite solution.

In a specific embodiment of the present invention, as the fibrous mat, use is made of an entangled non-woven fabric obtained by spinning mix-spun fibers composed of at least two high polymers having different solubilities in a solvent, in which at least on high polymer is dispersed as a large number of fine denier fiber components in a dispersing medium component of the other high polymer; if necessary, drawing the mix-spun fibers; separating said fibers in filament form and collecting the filaments to form a web; applying an oil composition on said web and subjecting said web to needle punching; the entangled non-woven fabric is impregnated with 20-170 parts by weight, preferably 30-140 parts by weight based on 100 parts by weight of the fibers, of the composite solution; the thus treated entangled non-woven fabric is immersed in the coagulation bath to coagulate the polymers in the composite solution; and then the dispersing medium component constituting the mix-spun fibers is dissolved off to form an excellent sheet material (sheet material III) having a tear strength of more than 2.0 Kg at a thickness of 0.5 mm, Cantilever softness of less than 85 mm and an elasticity (Monsanto method) of 95-155°, which has a very high tear strength, a soft and flexible feeling and a satisfactory drapability.

When the surface of said sheet material is slightly buffed to smoothen the surface, a sheet material (III) having a smooth surface formed by coexistence of the fibers and the polymers, which can be applied to printing or pattern printing, can be produced.

The present invention can produce sheet materials having various feelings and properties depending upon the properties of the polymers (A) and (B). By using a soft polymer having a high elasticity such as the polymer (A) and a polymer having a low elasticity such as the polymer (B), or using the reverse combination, a sheet material having a resilient, soft and flexible feeling, in which the naps do not substantially fall out, can be obtained. When a polymer having an excellent sponge formability is used as the polymer (A), if a polymer having a low elasticity is used as the polymer (B), a sheet material having a resilient flexibility and a moderate elastic recovery is obtained, while if a polymer having a high elasticity is used as the polymer (B), a sheet material having a resilient flexibility and a relatively high elastic recovery which is not a rubbery bounce impact elasticity, is obtained. Furthermore, suede-like sheet materials in which the feeling is broadly adjusted and the naps do not fall out and the fluffing ability is excellent, can be obtained by varying the mixture ratio of the polymers (A) and (B), the amount of the polymers contained in the sheet material and the coagulating process. These conditions may be conveniently settled depending upon the properties of the desired sheet materials.

In addition, when a density gradient is given to the sheet material by applying the polymers to the fibrous mat, setting temporarily said fibrous mat and then applying a size on the fibrous mat or pressing the fibrous mat by heat treatment, the feeling and the fluffing ability of the sheet material can be improved.

The following examples are given for the purpose of illustration of this invention and are not intended as limitations thereof. The "part" and "%" mean "by weight", unless it is stated otherwise.

EXAMPLE 1

To 70 parts of 15% DMF solution of polyether series polyurethane elastomer (polymer (A)) obtained by reacting polytetramethylene ether glycol having an average molecular weight of 1,000 with diphenylmethane diisocyanate and ethylene glycol and added 30 parts of a dispersion having a polymer concentration of 15% prepared by adding DMF to 45% dispersion of polyether series polyurethane elastomer (polymer (B)) obtained by reacting polypropylene ether glycol having an average molecular weight of 1,500 with tolylene diisocyanate and ethylene diamine and the mixture was stirred by a homomixer to prepare a composite solution (I) having a polymer concentration of 15%. In this composite solution, the polymer (A) was present in a solution and the polymer (B) was present in a dispersed state of fine particles having an average particle size of 1 $\mu$ and the whole liquid was translucent.

This composite solution was coated on a polyethylene sheet in such an amount that the solid matter becomes 60 g/m$^2$ and the coated sheet was immersed in 30% aqueous solution of DMF and left to stand for 10 minutes to coagulate the polymers. The resulting polyurethane sheet material was washed with water and then dried by fixing the width by a pin tenter. This polyurethane sheet formed a uniform fine porous sponge structure and a rubbery bounce, impact elasticity was low and the apparent density was 0.32 g/c.c.

On the other hand, for comparison, only the polymer (A) solution was coated on the polyethylene sheet in such an amount that the solid matter is 60 g/m$^2$ and the coated sheet was treated in the same manner as described above. The resulting polyurethane sheet (comparative sheet I) became partially dense and had a non-uniform sponge structure and the thickness of this sheet was uneven, the average apparent density was 0.545 g/c.c. and the elasticity was high.

EXAMPLE 2

To 80 parts of 15% DMF solution of polyurethane elastomer (polymer (A)) obtained by reacting polytetramethylene ether glycol having an average molecular weight of 2,000 with diphenylmethane diisocyanate and ethylene glycol in DMF was added 20 parts of a dispersion having a polymer concentration of 15% prepared by adding DMF to 30% aqueous dispersion of polyurethane elastomer (polymer (B)) obtained by emulsion polymerization of polytetramethylene ether glycol having an average molecular weight of 1,000 with diphenylmethane diisocyanate and ethylene diamine in n-hexane, and the mixture was thoroughly mixed by means of a homomixer to obtain a composite solution. The composite solution was coated on a polyethylene sheet in such an amount that the solid matter becomes 70 g/m$^2$ and the coated sheet was immersed in 30% aqueous solution of DMF to coagulate the polymers. The thus treated sheet was washed with water and dried by fixing the sheet with a pin tenter. The formed polyurethane sheet formed a uniform sponge structure, the apparent density was 0.35 g/c.c. and the moisture permeability was 2,950 g/m$^2$/day. This polyurethane sheet was soft and flexible and was low in rubbery bounce impace elasticity.

EXAMPLE 3

To 70 parts of 12% DMF solution of polyurethane elastomer (polymer (A)) having 4.0% of nitrogen content based on nitrogen of the isocyanate group and obtained by reacting polycaprolactone glycol with diphenylmethane diisocyanate and ethylene glycol of a chain extender was added 30 parts of 12% dispersion prepared by diluting 20% dispersion of polyurethane elastomer (polymer (B)) obtained by polymerization reaction of polytetramethylene ether glycol with diphenylmethane diisocyanate and a diamine of a chain extender in toluene-DMF mixture and the mixture was thoroughly mixed by stirring to prepare a composite solution. This composite solution was fluid and light milwhite and even after left to stand for 6 hours, the dispersed state of this composite solution was not changed.

This composite solution was coated on a polyethylene sheet in such an amount that the solid matter is 70 g/m$^2$. The coated polyethylene sheet was immersed in 30% aqueous solution of DMF to coagulate the polymers. The thus treated sheet was washed with water and the resulting polyurethane sheet had a smooth surface and a uniform sponge structure.

In this composite solution, when the coagulated and solidified polyurethane sheet was peeled from the polyethylene sheet, dirty white substances were generated and white powders were partially deposited on the polyethylene sheet. These powders were the polymer (B) and it has been found that these powders are observed when the average particle size of the polymer (B) in the dispersion was more than 5 $\mu$.

Thus, when the polymer (B) was produced, the polymer (B) having a ultra fine particle size of an average particle size of less than 2 $\mu$ was prepared by varying the emulsifier and stirring condition. The composite solution using such a polymer (B) was stable and was a good composite solution in which the falling of the white powders is not substantially observed.

For the comparison, to 70 parts of 12% DMF solution of the above described polymer (A) was added 30 parts of 12% DMF solution of polyurethane (polymer (B)) obtained by polymerization reaction of polytetramethylene ether glycol with diphenylmethane diisocyanate and ethylene glycol of a chain extender in DMF and the mixture was thoroughly mixed by stirring to prepare a composite solution.

When this composite solution was left to stand for 6 hours, said composite solution was separated into two phases. Then, this composite solution was stirred and mixed and immediately coated on a polyethylene sheet in such an amount that the solid matter becomes 70 g/m$^2$ and a polyurethane sheet was formed under the same condition as described above. This sheet readily generated wrinkles on the surface upon coagulating and the resulting sheet was partially translucent and there were portions where the good sponge structure is not formed and an area shrinkage was about 60% and the bounce impact elasticity of this polyurethane sheet was high.

EXAMPLE 4

An entangled non-woven fabric composed of 6-nylon fine denier bundle fibers, which had been produced from the mix spun fibers as explained hereinbefore, was impregnated with polyester series polyurethane and said polyurethane was coagulated to form a fibrous substrate. One surface of the fibrous substrate was buffed by means of a sand paper to smoothen the surface. On said surface the polyurethane sheet I obtained in Example 1 was adhered to form a surface layer. Then, the surface layer was colored and heat embossed at 145° C by means of a calf patterned embossing roll to obtain a leather-like sheet having a beautiful calf patterned surface and the structure of the wrinkle of crease was similar to the natural leather. This leather-like sheet had a thickness of 1.50 mm, an elasticity (Monosanto method) of 155° and a pliability (Gurley method) of 2,600 mg and was soft and flexible, and was low in the rubbery bounce impact elasticity.

On the other hand, for comparison, the leatherlike sheet produced by adhering the comparative sheet I produced from only the polymer solution (A) in Example 1 on the same fibrous substrate as described above and finishing in the same manner as described above, was not able to form the uniform embossed pattern and the surface was not satisfied. The form of the wrinkle of crease was similar to the bending of a rubber plate and the elasticity (Monsanto method) was 175°, the pliability (Gurley method) was 3,890 mg and the bounce impact elasticity was high and the sheet had a hard feeling.

EXAMPLE 5

To 90 parts of 13% DMF solution of polyurethane elastomer (polymer (A)) having 3.2% of nitrogen content based on nitrogen atom of isocyanate group and obtained by reacting polybutylene adipate glycol having an average molecular weight of 2,000 with diphenylmethane diisocyanate and a chain extender was added 6.5 parts of 20% aqueous dispersion of acrylic acid ester series resin (polymer (B)) and the mixture was thoroughly mixed by stirring with a homomixer to prepare composite solution. This composite solution was coated on a polyethylene sheet in such an amount that the solid matter becomes 100 g/m$^2$ and the coated sheet was immersed in 45% aqueous solution of DMF to gradually coagulate the polymers. The resulting sheet was washed with water and dried by fixing the width of the sheet with a pin tenter. The resulting polyurethane sheet formed a uniform fine porous sponge structure and was soft and flexible and was low in the rubbery bounce impact elasticity and had an excellent drapability.

This porous polyurethane sheet was adhered on the surface of a fibrous substrate produced as follows to form the surface layer. That is, an entangled non-woven fabric composed of nylon oriented multi-hole fibers, which had been produced from the mix spun fibers as explained hereinbefore, was impregnated with polyester series polyurethane and said polyurethane was coagulated to form a fibrous substrate and one surface of the fibrous substrate was buffed with a sand paper to smoothen the surface.

Then the surface was colored and heat embossed with a kid patterned embossing roll to form a leather-like sheet having a beautiful kid patterned surface.

This leather-like sheet was soft and flexible and was low in the rubbery bounce impact elasticity and excellent in drapability.

EXAMPLE 6

To 80 parts of 18% DMF solution of polyurethane elastomer (polymer (A)) having nitrogen content of 3.1% obtained by reacting polyethylene adipate glycol having an average molecular weight of 2,000 with diphenylmethane diisocyanate and 1,4-butane diol was gradually added 36 parts of 40% polyurethane elastomer (polymer (B)) obtained by reacting polytetramethylene ether glycol having an average molecular weight of 1,000 with tolylene diisocyanate and a chain extender and the mixture was thoroughly mixed by stirring to prepare a composite solution. This composite solution was coated on a chromium plated metal belt in such an amount that the solid matter is 90 g/m$^2$. The coated sheet was immersed in 25% aqueous solution of DMF and the polymers were rapidly coagulated. The thus treated sheet was washed with water and dried by a cylinder drier. The obtained polyurethane sheet formed an even uniform porous sponge structure and even if the sheet was bent, the bending was satisfactorily conducted and this polyurethane sheet was soft and flexible and was low in the bounce impact elasticity.

This porous polyurethane sheet was adhered on a smooth surface of a fibrous substrate produced as follows to form a surface layer. That is, an entangled non-woven fabric composed of polyester ultra-fine denier bundle fibers was impregnated with polyarcrylic acid ester and then treated with melamine resin solution to form a fibrous substrate, a surface of which was smoothened. The surface layer was colored and then heat embossed with a crepe patterned embossing roll to form a smooth crepe patterned leather-like sheet.

This leather-like sheet had a thickness of 1.50 mm, an elasticity (Monsanto method) of 148°, a pliability (Gurley method) of 2,640 mg and a pliability (Heart loop method) of 14 g/mm and was soft and flexible and the wrinkle of crease was fine and beautiful as in the natural leather.

On the other hand, the polyurethane sheet obtained from only the polymer (A) solution in the same manner as described above was uneven in the sponge structure and when such a sheet was bent, the sheet was bent in an acute angle. This polyurethane sheet had a high bounce impact elasticity.

This polyurethane sheet was adhered on the above described fibrous substrate and finished under the same conditions as described above. However, in this case, the crepe patterned embossing was not satisfactorily applied, so that the embossing was carried out at a higher temperature and under a high pressure. Nevertheless, the resulting sheet was not satisfactorily smooth. This leather-like sheet had a thickness of 1.50 mm, an elasticity (Monsanto method) of 170°, a pliability (Gurley method) of 4,150 mg and a pliability (Heart loop method) of 21.5 g/mm and was high in the rubbery bounce impact elasticity and was hard.

EXAMPLE 7

The porous polyurethane sheet obtained in Example 1 was adhered on a napped surface of a suede fabric impregnated with polyurethane elastomer to form a surface layer and said surface layer was colored and heat embossed by a sheep patterned embossing roll to form a leather-like sheet. In this sheet, a beautiful sheep pattern was embossed and the wrinkle of crease was similar to the natural leather and the bounce impact elasticity was low, the flexibility was high and the drapability was excellent, so that this sheet was suitable for clothing material.

On the other hand, a sheet obtained by adhering the comparative sheet obtained in Example 1 on the suede fabric and finishing said sheet in the same manner as described above, was not able to form the sheep pattern even by effecting such an embossing and the pattern of the fabric texture was apparently observed on the surface and the bounce impact elasticity was high and the sheet gave a rubber sheet-like feeling and was not suitable for clothing material.

EXAMPLE 8

The same composite solution as used in Example 1 was coated on a surface of a fibrous substrate produced in the following manner in such an amount that the solid matter is 70 g/m$^2$. That is, an entangled non-woven fabric composed of polyester ultra fine denier bundle fibers was impregnated with polyester type polyurethane and said polyester type polyurethane was coagulated to form a fibrous substrate and then one surface of said fibrous substrate was buffed with #180 sand paper to smoothen the surface.

The coated sheet was immersed in 30% aqueous solution of DMF to coagulate the polymer and then washed with water and dried by fixing the width with a tenter to form a surface layer. This surface layer was a microporous sponge structure. This surface layer was colored and heat embossed with a crepe patterned embossing roll. The resulting leather-like sheet was very smooth in the surface and the wrinkle of crease was fine and beautiful. This sheet had an elasticity (Monsanto method) of 152°, a pliability (Gurley method) of 2,600 mg, a moisture permeability of 1,100 g/m²/day and was soft and flexible and was low in the bounce impact elasticity and excellent in the moisture permeability.

For comparison, only a polymer (A) solution in Example 1 was coated on the above described fibrous substrate in such an amount that the solid matter is 70 g/m² and the coagulation and finishing were effected in the same manner as described above to form a leather-like sheet. The resulting sheet was difficult partially in the embossing and the surface layer was a non-uniform sponge structure. This sheet had an elasticity (Monsanto method) of 177°, a pliability (Gurley method) of 3,990 mg, a moisture permeability of 320 g/m²/day and was high in bounce impact elasticity and low in moisture permeability.

EXAMPLE 9

To 90 parts of 13% DMF solution of polyurethane elastomer (polymer (A)) obtained by reacting polytetramethyleneether glycol having an average molecular weight of 1,500 with tolylene diisocyanate and a chain extender was added 2.9 parts of 45% aqueous dispersion of acrylic acid ester resin (polymer (B)) and the mixture was mixed thoroughly by a homomixer to prepare a composite solution. This composite solution was coated on a smooth surface of a fibrous substrate produced by the following manner in such an amount that the solid matter is 100 g/m². The fibrous substrate was produced by impregnating a nylon entangled non-woven fabric with polyester type polyurethane elastomer and said elastomer was coagulated to form a fibrous substrate, one surface of which was buffed to smoothen the surface. The coated fibrous substrate was immersed in 45% aqueous solution of DMF to coagulate gradually the composite solution, washed with water and dried. The thus obtained surface layer formed a uniform porous sponge structure. This surface was colored and heat embossed with a calf patterned embossing roll to obtain a leather-like sheet.

This sheet had an elasticity (Monsanto method) of 147° and a moisture permeability of 1,050 g/m²/day and was soft and flexible and was low in bounce impact elasticity and high in the moisture permeability. The surface showed a calf pattern and caused beautiful wrinkles of crease.

EXAMPLE 10

By using 6-nylon staple fibers having a fineness of 1.5 denier was formed a web and this web was subjected to needle punching in a needle punching density of 560 p/cm² to obtain an entangled non-woven fabric. This non-woven fabric was impregnated with 5% aqueous solution of polyvinyl alcohol and dried and then compression set by a roller press to increase the density of the non-woven fabric to 0.22 g/cm².

A composite solution to impregnate on the non-woven fabric was prepared as follows. To 60 parts of 15% DMF solution of polyester series polyurethane (polymer (A)) obtained by reacting polyethylene adipate glycol with 4,4'-diphenylmethane diisocyanate and ethylene glycol was added 40 parts of 15% dispersion in which polyether series polyurethane (polymer (B)) particles were dispersed in a slightly transparent milk-white state and which was obtained by diluting 45% aqueous dispersion of polyurethane obtained by reacting polytetramethylene ether glycol with tolylene diisocyanate and ethylene diamine, with DMF to prepare a composite solution (composite solution II).

The above described non-woven fabric was impregnated with the above described composite solution (II) at 14° C and the impregnated non-woven fabric was immersed in water at 40° to coagulate the polymers. Then, polyvinyl alcohol was removed in hot water at about 85° C and the thus treated non-woven fabric was dried with hot air in a tenter dryer in which the width of the fabric is fixed. Both surfaces of the resulting sheet were buffed by #180 sand paper, fluffed, brushed, dyed and then subjected to a softening treatment to obtain a suede-like material (1) having a thickness of 0.80 mm.

For comparison, a suede-like sheet material (2) was produced by using only the polymer (A) solution in the above described production step and treating in the same manner as described above.

The comparison of the properties of the suede-like material (1) with those of the suede-like material (2) is shown in the following Table 1.

Table 1

|  | Bounce impact elasticity (Monsanto method) | cantilever softness (mm) | Feeling | Napping ability | Tear* strength (kg) |
|---|---|---|---|---|---|
| Suede-like material (1) Present invention | 128° | 53 | Resilient flexibility | Good | 2.1 |
| Suede-like material (2) Comparative | 165° | 67 | High bounce impact elasticity Fairly rubbery | Long nap | 1.8 |

*Tear strength at 0.5 mm (value at 0.8 mm is calculated into value at 0.5 mm).

EXAMPLE 11

A web was formed by using mix spun fibers consisting of 50 parts of polyethylene terephthalate and 50 parts of polyethylene, in which polyethylene terephthalate is dispersed as the fine denier fiber component in the dispersion medium component of polyethylene, by a dry process and the resulting web was subjected to needle punching to form an entangled non-woven fabric. This non-woven fabric was treated under hot air at 135° C for 5 minutes. The thus treated non-woven fabric sheet was fully impregnated with the polymer composite solution (II) used in Example 10 and immersed in 30% aqueous solution of DMF to coagulate the polymers and then the non-woven fabric was washed with water and dried. The obtained sheet material was treated with hot toluene to dissolve off the polyethylene component constituting the mix spun fibers, whereby the fibers were deformed into polyethylene terephthalate fine denier bundle fibers. Then the sheet material was sliced at the center and divided into two sheet materials. Both surfaces of each sheet material were subjected to buffing by means of a sand paper, crumpling in water, dyeing, crumpling, finishing treatment and brushing to obtain a suede-like sheet material (3).

On the other hand, in the above described production step, the same working as described above was carried out by using only the polymer (A) in Example 10 to obtain a suede-like sheet material (4).

The properties of these sheet materials are compared in the following Table 2.

Table 2

|  | Bounce impact elasticity (Monsanto method) | Cantilever softness (mm) | Feeling | Napping ability | Tear* strength (kg) |
| --- | --- | --- | --- | --- | --- |
| Suede-like material (3) Present invention | 115° | 47 | Resilient flexibility | Good napped state Naps do not fall out Good writing effect | 2.5 |
| Suede-like material (4) Comparative | 159° | 55 | Fairly high in bounce impact impact elasticity | Fairly long nap Naps fall out Fairly bad writing effect | 2.0 |
| Natural leather suede | 110° | 40 | Resilient flexibility | Good napped state Naps do not fall out Good writing effect | 1.5 |

*Value in 0.5 mm

As seen from the above table, the suede-like sheet material (3) is very similar to natural leather in the nap structure, feeling and properties and is higher in the tear strength than natural leather.

EXAMPLE 12

The non-woven fabric sheet of Example 11 was impregnated with the following polymer composite solution.

70 parts of 20% DMF solution of polyurethane (polymer (A)) obtained from a mixed polymer glycol of polyethylene adipate glycol and polyethylene ether glycol as the soft segment was added with 30 parts of 20% dispersion obtained by diluting NBR (polymer (B)) (not completely dissolved in DMF) latex with DMF to prepare a composite solution.

The impregnated non-woven fabric sheet was immersed in 40% aqueous solution of DMF to coagulate the polymers. The thus treated sheet was washed with water and dried. Then, polyethylene constituting the fibers was extracted and removed by hot trichlorethylene and the thus treated non-woven fabric sheet was dried and finished into a suede-like sheet in the same manner as described in Example 11.

The obtained sheet was resilient and soft and flexible and had a high dyeability and was suitable for a material of lady's suede shoes.

EXAMPLE 13

A non-woven fabric manufactured by using mix spun fibers consisting of 55 parts of 6-nylon and 45 parts of polystyrene was impregnated with the following composite solution.

60 parts of 20% DMF solution of polybutylene adipate series polyurethane (polymer (A)) was mixed with 40 parts of 20% dispersion obtained by diluting a mixture (polymer (B)) of polyacrylic acid ester aqueous dispersion and melamine resin solution in a mixture ratio of 8:2 with DMF to prepare a composite solution.

The impregnated non-woven fabric sheet was treated with a steam bath to coagulate the polymers and further immersed in warm water at 60° C to complete the coagulation and to remove the solvent and then dried. The thus obtained sheet was treated in perchlorethylene to dissolve off the main part of the polystyrene constituting the fibers and then subjected to buffing by means of #80 sand paper and further subjected the napped surface to brushing by means of a wire brush rotating in a high speed, whereby the top of the nylon oriented multi-hole fibers are broken and a suede-like sheet material having the nap structure of natural leather suede was obtained.

By subjecting this sheet to a suede finishing treatment, a sheet material having a natural leather suede-like appearance, napped state and resilient, soft and flexible feeling was obtained.

EXAMPLE 14

A non-woven fabric formed by using mix spun fibers consisting of 55 parts of 66-nylon and 45 parts of polystyrene was impregnated with 10% aqueous solution of carboxylmethyl cellulose and the impregnated non-woven fabric was dried and then immersed in toluene to dissolve off the polystryene, after which toluene was washed with methanol and a non-woven fabric sheet formed of the deformed fibers was obtained.

The thus obtained non-woven fabric was impregnated with the following composite solution.

50 parts of 15% solution of polybutylene adipate series polyurethane (polymer (A)) was dissolved in tetrahydrofuran and the resulting solution was diluted with dioxane to prepare 15% solution of the polymer (A). 50 parts of said 15% solution of the polymer (A) was mixed with 50 parts of 15% dispersion of polytetramethylene ether series polyurethane (polymer (B)) in toluene-acetone mixture.

The impregnated non-woven fabric was immersed in an aqueous solution of methanol to coagulate the polymers and such a sheet was washed with water and dried. The formed sheet was subjected to buffing by means of a sand paper to form a napped surface. The obtained suede-like sheet material had a moderate elastic recovery, a resilient softness, a smooth and lustrous surface and an excellent writing effect.

EXAMPLE 15

Mix-spun fibers consisting of 50 parts of polyethylene and 50 parts of polyethylene terephthalate, wherein the polyethylene terephthalate component was dispersed as 450 ultra fine denier fibers in the dispersion medium of the polyethylene, were spun and drawn by a roller. Then, the drawn fibers were distributed on a metal screen in the longitudinal direction and the transverse direction by an air gun oscillator to form a filament web of about 150 g/m$^2$ and the formed web was subjected to needle punching in a rate of punch number 30 times/cm$^2$ and rolled by and then two webs were laminated, after which an oil composition was applied on the laminate by a spray and the thus treated laminate was subjected to needle punching of punch number 490 times/cm$^2$ by means of #40 needle and then introduced in turn into a hot air zone at 135° C to effect heat treatment, whereby the joining points of the fibers were set to produce an entangled non-woven fabric sheet.

A composite solution was prepared by mixing 100 parts of 15% DMF solution of polyester series polyurethane obtained by reacting polyethylene adipate glycol having an average molecular weight of 2,000 with 4,4'-diphenylmethane diisocyanate and 1,4-butane diol was mixed with 30 parts of 15% dispersion of polyacrylic acid ester resin and the mixture was additionally added with an active agent.

The above described non-woven fabric was impregnated with the above described composite solution and immersed in a coagulation bath which coagulates relatively gradually the polymers to form a porous sheet by the mutual function of the coagulating condition and the active agent. The resulting sheet was immersed in hot toluene at about 90° C to dissolve off the polyethylene component in the mix-spun fibers, whereby the mix-spun fibers were deformed into fine denier polyethylene terephthalate bundle fibers and the adhesion of the filaments and the resin was removed.

Both the surfaces of the dried sheet material were buffed by means of #180 sand paper and then one surface was buffed by means of #240 sand paper to obtain the sheet having a thickness of 0.55 mm. The surface was a smooth one having few naps, and vein-like fiber bundle was not observed. On this surface, was coated an easily soluble polyurethane solution by a gravure patterned roll and further the surface was subjected to figure patterned embossing by means of a heated embossing roll provided with clearance and dyed with 1:2 type metal complex salt dye.

In the obtained sheet material, porous polyurethane having an apparent porosity of about 68% was filled in spaces of the entangled non-woven fabric of ultra fine denier bundle fibers, the ratio of fiber:resin was 64:36, the tear strength was 3.9 kg. Oantilever softness was 41 mm and the elasticity (Monsanto method) was 132° and this sheet material had resilient, soft and flexible leather-like feeling and the surface was dyed in a beautiful pattern and this sheet material was suitable for clothing.

What is claimed is:

1. A method for producing a leather-like sheet material having a good sponge structure and low bounce impact elasticity, which comprises,
    a. preparing a composite solution by mixing (i) a solvent solution of a polymer (A) consisting mainly of an elastomer having an initial modulus of less than $5 \times 10^2$ Kg/cm$^2$ and (ii) a dispersion in a liquid dispersing medium of a polymer (B) consisting mainly of an elastomer having an initial modulus of less than $5 \times 10^2$ Kg/cm$^2$ and having a particle size less than $5\mu$, said said solvent for (A) not completely dissolving (B), thereby resulting polymer (B) being dispersed but not completely dissolved in said composite solution, the ratio of (A) to (B) being in the range of 95 : 5 to 30 : 70 parts by weight;
    b. coating a supporting sheet in a given thickness or impregnating a fibrous mat with the composite solution;
    c. immersing the coated supporting sheet or the impregnated fibrous mat in a liquid coagulation bath for coagulating said polymers (A) and (B); thereby depositing and coagulating said polymers on said supporting sheet or in said fibrous mat; and sheet or said;
    d. drying said sheet or said mat.

2. A method as claimed in claim 1, additionally comprising fluffing at least one surface of the impregnated and dried mat to produce a suede-like material.

3. A method as claimed in claim 13, wherein the fibrous mat is composed of mix spun fibers of at least two polymers having different solubility in a solvent.

4. A method as claimed in claim 1, for producing a leather-like sheet material having a low bounce impact elasticity and a good embossing ability, wherein said fibrous mat is made by a process which comprises: spinning at least two polymers having different solubilities in a solvent into mix-spun fibers wherein at least one polymer is dispersed as a large number of ultrafine denier fiber components in a dispersion medium component of the other polymer; separating said fibers into filaments; collecting the filaments to form a mat; applying an oil composition to said mat; subjecting said mat to needle punching to form an entangled non-woven fabric; and between said steps (c) and (d), dissolving off the dispersion medium component constituting the above described mix-spun fibers by a solvent to deform the mixspun fibers into fine denier bundel fibers.

* * * * *